(12) United States Patent
Schwartz et al.

(10) Patent No.: US 11,824,880 B2
(45) Date of Patent: Nov. 21, 2023

(54) DETECTION OF VULNERABLE WIRELESS NETWORKS

(71) Applicant: Armis Security Ltd., Tel Aviv (IL)

(72) Inventors: Tomer Schwartz, Tel Aviv (IL); Nadir Izrael, Tel Aviv (IL)

(73) Assignee: ARMIS SECURITY LTD., Tel Aviv (IL)

( * ) Notice: Subject to any disclaimer, the term of this patent is extended or adjusted under 35 U.S.C. 154(b) by 140 days.

(21) Appl. No.: 15/339,229

(22) Filed: Oct. 31, 2016

(65) Prior Publication Data

US 2018/0124093 A1   May 3, 2018

(51) Int. Cl.
*H04L 9/40* (2022.01)
*H04W 12/12* (2021.01)
*H04W 84/12* (2009.01)
*H04W 12/67* (2021.01)

(52) U.S. Cl.
CPC ......... *H04L 63/1433* (2013.01); *H04W 12/12* (2013.01); *H04L 63/1425* (2013.01); *H04W 12/67* (2021.01); *H04W 84/12* (2013.01)

(58) Field of Classification Search
CPC . H04L 63/1433; H04L 63/14; H04L 63/1408; H04L 63/1416; H04L 63/1425; H04L 63/1441; H04L 63/145; H04L 63/1466; H04L 63/1475; H04L 63/1483; H04L 63/1458; H04W 12/12; H04W 84/12; H04W 12/00505; H04W 12/67; H04W 12/122; H04W 12/79
See application file for complete search history.

(56) References Cited

U.S. PATENT DOCUMENTS

| | | | |
|---|---|---|---|
| 5,471,459 | A | 11/1995 | Gut |
| 6,363,489 | B1 | 3/2002 | Comay et al. |
| 7,603,710 | B2 | 10/2009 | Harvey et al. |
| 7,853,250 | B2 | 12/2010 | Harvey et al. |

(Continued)

FOREIGN PATENT DOCUMENTS

| | | |
|---|---|---|
| RU | 124102 U1 | 1/2013 |
| WO | 2015113036 A1 | 7/2015 |

OTHER PUBLICATIONS

The International Search Report and The Written Opinion for PCT/US2017/057830, ISA/RU, Moscow, Russia, dated Jan. 18, 2018.

(Continued)

*Primary Examiner* — Amie C. Lin
(74) *Attorney, Agent, or Firm* — Perkins Coie LLP (57) ABSTRACT

A method and system for detecting vulnerable wireless networks coexisting in a wireless environment of an organization are provided. The method includes receiving intercepted traffic, wherein the intercepted traffic is transmitted by at least one wireless device operable in an airspace of the wireless environment, wherein the intercepted traffic is transported using at least one type of wireless protocol; analyzing the received traffic to detect at least one active connection between a legitimate wireless device of the at least one wireless device and at least one unknown wireless device, wherein the legitimate wireless device is at least legitimately authorized to access a protected computing resource of the organization; and determining if the at least one detected active connection forms a vulnerable wireless network.

25 Claims, 6 Drawing Sheets

(56) References Cited

U.S. PATENT DOCUMENTS

| | | | |
|---|---|---|---|
| 8,468,606 B2 | 6/2013 | Weyer et al. | |
| 8,875,255 B1 | 10/2014 | Dotan et al. | |
| 9,154,516 B1 | 10/2015 | Vaystikh et al. | |
| 9,166,999 B1 | 10/2015 | Kulkarni et al. | |
| 9,456,343 B1 | 9/2016 | Mihalache et al. | |
| 10,015,185 B1 | 7/2018 | Kolman et al. | |
| 10,771,498 B1* | 9/2020 | Tamhane | H04W 12/12 |
| 2004/0049699 A1* | 3/2004 | Griffith | H04L 63/1408 726/23 |
| 2005/0002025 A1 | 1/2005 | Goto et al. | |
| 2005/0188215 A1 | 8/2005 | Shulman et al. | |
| 2007/0142030 A1* | 6/2007 | Sinha | H04L 63/1433 455/410 |
| 2008/0086776 A1* | 4/2008 | Tuvell | G06F 21/564 726/24 |
| 2009/0235354 A1* | 9/2009 | Gray | H04L 63/1416 726/22 |
| 2011/0046920 A1 | 2/2011 | Amis | |
| 2013/0097699 A1* | 4/2013 | Balupari | H04L 63/1441 726/22 |
| 2013/0097711 A1 | 4/2013 | Basavapatna et al. | |
| 2013/0179988 A1 | 7/2013 | Bekker et al. | |
| 2013/0191919 A1 | 7/2013 | Basavapatna et al. | |
| 2013/0227689 A1 | 8/2013 | Pietrowicz et al. | |
| 2014/0237545 A1 | 8/2014 | Mylavarapu et al. | |
| 2014/0241373 A1 | 8/2014 | Pasam et al. | |
| 2014/0247728 A1 | 9/2014 | Amitai et al. | |
| 2014/0282905 A1 | 9/2014 | Iyer et al. | |
| 2014/0283029 A1 | 9/2014 | Chandrasekaran et al. | |
| 2015/0113133 A1 | 4/2015 | Srinivas et al. | |
| 2015/0128236 A1 | 5/2015 | Moscicki et al. | |
| 2015/0229664 A1 | 8/2015 | Hawthorn et al. | |
| 2015/0326601 A1 | 11/2015 | Grondin et al. | |
| 2015/0339912 A1 | 11/2015 | Farrand et al. | |
| 2015/0350228 A1 | 12/2015 | Baxley et al. | |
| 2015/0350902 A1 | 12/2015 | Baxley et al. | |
| 2016/0099963 A1 | 4/2016 | Mahaffey et al. | |
| 2016/0112878 A1 | 4/2016 | Kaushik | |
| 2016/0277427 A1* | 9/2016 | Deshpande | H04L 63/1416 |
| 2017/0063906 A1* | 3/2017 | Muddu | H04L 63/1425 |
| 2017/0180384 A1 | 6/2017 | Malenfant et al. | |
| 2017/0244746 A1 | 8/2017 | Hawthorn et al. | |
| 2017/0257363 A1 | 9/2017 | Franke et al. | |
| 2018/0097840 A1 | 4/2018 | Murthy | |

OTHER PUBLICATIONS

The International Search Report and the Written Opinion of the International Searching Authority for PCT/US2017/057832, ISA/RU, Moscow, Russia, dated Mar. 22, 2018.

* cited by examiner

DETECTION OF VULNERABLE WIRELESS NETWORKS

TECHNICAL FIELD

The present disclosure generally relates to cybersecurity systems, and more particularly to detection of vulnerable wireless networks coexisting in a secured environment.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack.

The ever increasing utilization of wireless devices and wireless networks poses a real threat to any organization, due to vulnerabilities of such devices. Practically any electronic device is now connected to the internet over a wireless connection, thereby rendering communications susceptible to interception or interference. Furthermore, in a typical organization, many wireless networks coexist, where each such network may be secured or unsecured. An attacker can access a wireless device or a different network through almost any wireless network or wireless connection (e.g., a Bluetooth® connection).

Another factor that increases the vulnerability of an organization is the fact that employees or guests often want to use their own devices to access data, some or all of which may be sensitive data. This type of data access using personal devices is typically referred to bring your own device (BYOD). Of course, devices not setup specifically for the organization can put the organization's sensitive business systems and data at further risk.

As an example, a recent vulnerability in FitBit® fitness trackers infects nearby devices with malware over a Bluetooth® connection. Currently, cyber-attacks over Bluetooth® require an attacker to be in physical proximity (e.g., within a few meters) a target device. The infecting malware can be delivered just seconds after connection of devices and, as a result, even fleeting proximity can be a problem. Thus, an employee with an infected FitBit® fitness tracker can unintentionally infect other devices in the organization with malware by connecting the infected FitBit® tracker to other devices. The employee's device could have been exploited by a hacker, for example, on a subway ride.

To secure their systems, infrastructure, and services, organizations utilize many different security products. A typical organization network is protected by products such as firewalls, anti-virus software, malware detection software, authentication and authorization systems, intrusion detection, anti-phishing systems, network and end point behavior analysis, data leak prevention systems, web application firewalls (WAFs), and so on.

Typically, such products are utilized to detect, mitigate, or both detect and mitigate known vulnerabilities or threats. As an example, an enterprise network can implement one security product for an intrusion detection system (IDS) and another product for detecting malware downloaded by a remote resource that is sent to a secured resource in the organization over the Internet. The defense provided by an IDS is limited to the internal (and monitored) networks, but cannot be utilized to detect intrusion to and from unmonitored networks, e.g., wireless networks co-existing in the wireless environment of the internal network.

As another example, a conventional data leak prevention system can detect a sensitive document sent to an end-point over the Internet. However, such a system cannot detect a sniffer that traps any document sent to a wireless printer in the organization.

The aforementioned shortcomings are due to the fact that existing security solutions are designed to scan wireless activity by any wireless network, wireless activity in the protected organization, or both. Further, such existing security solutions are typically not designed to monitor activity of devices that are legitimately connected to a protected organization's infrastructure or network.

Another challenge posed by the myriad of wireless devices that may connect to an organization's infrastructure or network is that software and firmware are frequently updated. For example, a typical smartphone is updated with a release of new software updates for an operating system (OS) and for each application installed thereon at least annually. Thus, trying to profile such devices may be an inefficient task.

It would therefore be advantageous to provide a cybersecurity solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for detecting vulnerable wireless networks coexisting in a wireless environment of an organization are provided. The method comprises receiving intercepted traffic, wherein the intercepted traffic is transmitted by at least one wireless device operable in an airspace of the wireless environment, wherein the intercepted traffic is transported using at least one type of wireless protocol; analyzing the received traffic to detect at least one active connection between a legitimate wireless device of the at least one wireless device and at least one unknown wireless device, wherein the legitimate wireless device is at least legitimately authorized to access a protected computing resource of the organization; and determining if the at least one detected active connection forms a vulnerable wireless network.

Some embodiments disclosed herein include system for detecting vulnerable wireless networks coexisting in a wireless environment of an organization. The system comprises a processing circuitry; and a memory, the memory containing instructions that, when executed by the processing circuitry, configure the system to: receive intercepted traffic, wherein the intercepted traffic is transmitted by at least one wireless device operable in an airspace of the wireless environment, wherein the intercepted traffic is transported using at least one type of wireless protocol; analyze the received traffic to detect at least one active connection between a legitimate wireless device of the at least one wireless device and at least one unknown wireless device, wherein the legitimate wireless device is at least legitimately authorized to access a protected computing resource of the organization; and determine if the at least one detected active connection forms a vulnerable wireless network.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In a typical organization, there are many wireless networks that are not part of the organization's infrastructure. Such networks may be vulnerable and may include networks setup by attackers to target the organization's secured resources or networks setup by an employee using an unsecured hotspot. By way of example, the various disclosed embodiments include techniques for detecting vulnerable wireless networks. In an embodiment, wireless traffic transmitted by devices operable in an airspace of an organization is intercepted and analyzed. The analysis is performed in part to identify connections initiated by any device to any computing resource in the organization. Then, such connection is further analyzed to determine if it forms a vulnerable network.

Figure 1:
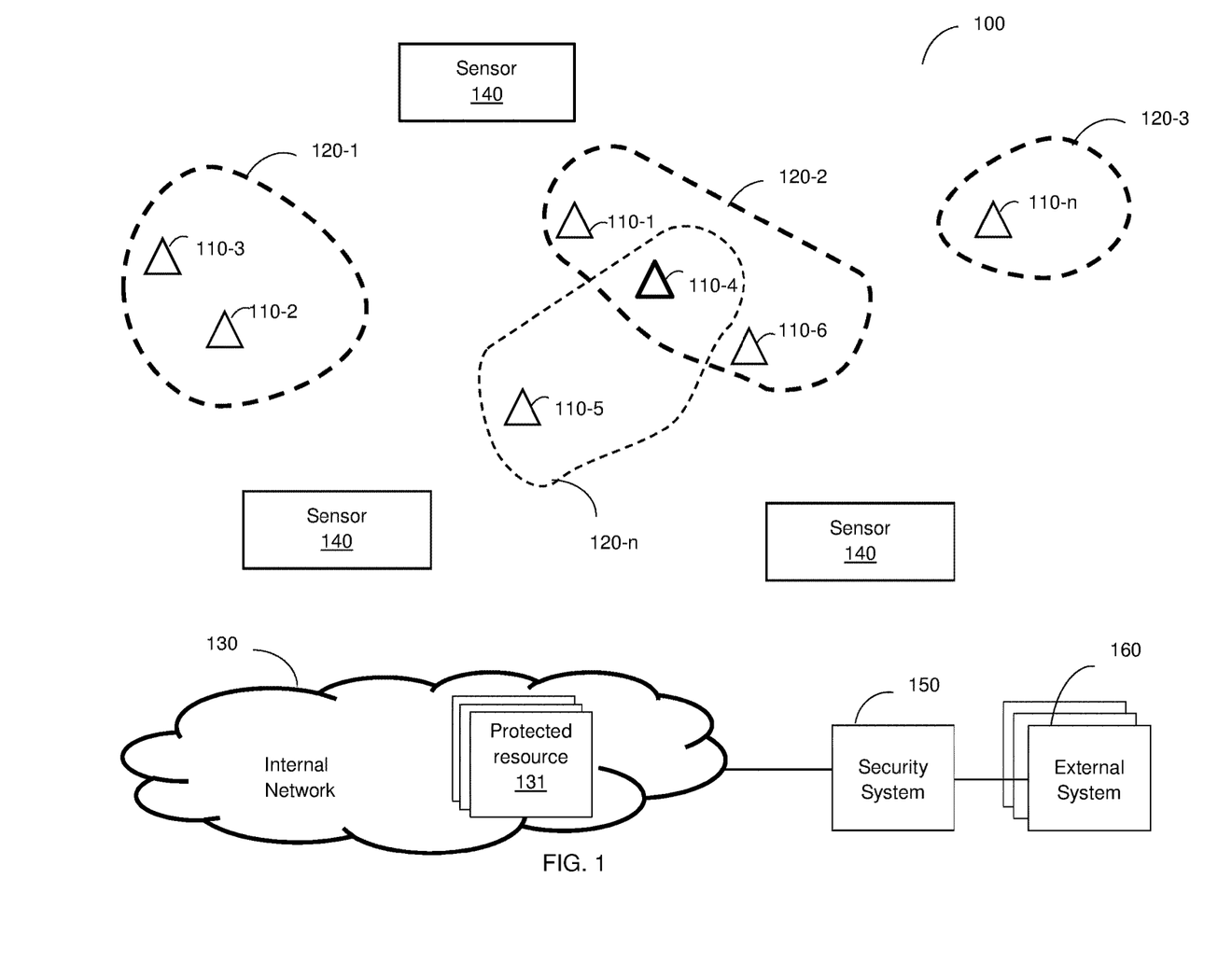
FIG. 1 is a diagram of a wireless environment utilized to describe the various disclosed embodiments.

FIG. 1 is an example network diagram of a wireless environment 100 utilized to describe the various disclosed embodiments. The wireless environment 100 includes a plurality of wireless devices 110-1 through 110-m (hereinafter referred to individually as a wireless device 110 and collectively as wireless devices 110, merely for simplicity purposes) and a plurality of coexisting wireless networks 120-1 through 120-n (hereinafter referred to individually as a wireless network 120 and collectively as wireless networks 120, merely for simplicity purposes), thereby allowing communication between and among the wireless devices 110. Also operable in the wireless environment 100 is an internal network 130 of an organization. The internal network 130 includes protected resources 131. Such protected resources 131 may include, but are not limited to, servers, computers, databases, services, applications, data, and the like.

Each wireless device 110 may be, but is not limited to, a laptop, a PC, a smartphone, an IoT device, a wearable device, a peripheral device (e.g., a printer, a mouse, a keyboard, a speaker, etc.), an appliance, a remote controller, a wireless router (access point), or any electrical or electronic device that can communicate over a wireless network.

The wireless network 120 can facilitate communication using wireless communication protocols including, but not limited to, Wi-Fi, nRF, cellular communication protocols (e.g., LTE, 2G, 3G, 4G, etc.), Bluetooth®, Wi-Gi, Zigbee, Z-Wave, 5 BLE, EnOcean, DECT, and the like. It should be noted that application layer protocols can communicate over such wireless protocols. Examples for application layer protocols include, but are not limited to, AirDrop®, HTTP, SMB, NTLM, OBEX, and the like.

According to the disclosed embodiments, a plurality of sensors (hereinafter referred to collectively as sensors 140) and a security system 150 are deployed in the wireless network 100. Each sensor 140 is deployed as an out-of-band device and configured to monitor and control the wireless traffic transmitted by the wireless devices 110 in the proximity of where the sensor 140 is deployed. Each sensor 140 is configured to process the monitored traffic based on a corresponding wireless commination protocol. For example, if the monitored traffic is transmitted over a Bluetooth® connection, the sensor 140 is configured to extract data as carried by the Bluetooth® protocol through its entire stack. Such data may include headers and payload data required to determine, for example, if a new connection is established, existence connection is identified, and/or a type of data being transmitted. Therefore, to this end, each sensor 140 is configured to process the complete stack of each wireless protocol supported by the sensor. Examples for such wireless protocols are mentioned above. In an embodiment, each sensor 140 can handle at least one type of wireless protocol.

In another embodiment, the sensor 140 can extract traffic parameters by querying network devices (not shown) installed or deployed in the environment 100. For example, the sensor 140 can query a wireless access point about new connections being established.

The data extracted by each sensor 140 is sent to the security system 150 for further analysis. In some embodiments, only data that can be utilized to detect vulnerable networks is sent to the security system 150. For example, when the sensor 140 identifies a new wireless connection, data associated with the new wireless connection is sent to the security system 150.

In an embodiment, the sensor 140 is also configured to perform at least one mitigation action under the control of the security system 150. For example, the sensor 140 can terminate a wireless connection determined to be vulnerable.

Each sensor 140 may be realized as a physical appliance, a virtual appliance (executed by a processing system), or a combination thereof. Examples for virtual appliance implementations include, but are not limited to, a virtual machine, a micro-service, a software agent, and the like.

The security system 150 may be deployed in a datacenter, a cloud computing platform (e.g., a public cloud, a private cloud, or a hybrid cloud), on-premises of an organization, or in a combination thereof.

In an example deployment, the security system 150 is configured to interface with one or more external systems 160. Examples for such systems 160 may include, but are not limited to, an active directory of the organization utilized to retrieve user permissions, access control systems, SIEM systems utilized to report on detected vulnerabilities, or other devices that can feed the security system 150 with potential threats or known vulnerabilities.

The security system 150 is configured to detect if any of the wireless networks 120 are vulnerable based on data extracted by and received from the sensors 140, and hence any potential vulnerable networks including a group (i.e., two or more) of wireless devices 110 or a single connected device 110.

In an embodiment, the security system 150 is configured to determine, based on data received from the sensors 140 when the wireless network 120 connects to the internal network 130, when the wireless network 120 accesses a protected resource 131, or both. In a further embodiment, when such a connection or access is determined, the security system 150 may be configured to consider the wireless network 120 as a vulnerable network.

Alternatively or collectively, the security system 150 is configured to determine if the wireless network 120 bridges between the internal network 130 and a resource (not shown) external to the environment 100. For example, such an external resource may be a command-and-control server, a drop zone or end-point, and the like. In an embodiment, if it is determined that the wireless network 120 bridges between the internal network 130 and an external resource, the security system 150 may be configured to determine the wireless network 120 as vulnerable.

Alternatively or collectively, the security system 150 is configured to determine if the wireless network 120 is an unknown network or if any device 110 connected in the wireless network 120 performs malicious activity. Malicious activity may include, for example, trafficking sensitive information, any activity that matches a known attack pattern, abnormal activity, or a combination thereof. In an embodiment, if it is determined that the wireless network 120 is an unknown network or that the device 110 performs malicious activity, the security system 150 may determine the wireless network 120 as vulnerable. An unknown network is a network that is not part of the IT infrastructure of the organization.

In an embodiment, the security system 150 is configured to determine a risk factor for each wireless network 120 determined to be suspicious or vulnerable. The risk factor is based on, for example, the type of the detected vulnerability, the internal resources being accessed, the type of data being exploited, a device type, a connection type, any combination thereof, and so on.

In an embodiment, upon determining the wireless network 120 as vulnerable, the security system 150 is configured to perform or initiate a mitigation action. A mitigation action may include, but is not limited to, terminating any connection to the vulnerable wireless network 120, from the vulnerable wireless network 120, or both. For example, if a vulnerable wireless network 120 is a Wi-Fi network, a connection to an access point can be terminated.

In an embodiment, upon detection of a vulnerable wireless network 120, an alert is generated, displayed, or otherwise reported to a user of the security system 150. In some example embodiments, an event indicating detection of a vulnerable wireless network 120 is generated and sent to an external system (e.g., a SIEM system).

According to the disclosed embodiments, the security system 150 is configured to create a list of legitimate devices. A legitimate device is a wireless device 110 that is authorized to access the internal network 130 or any protected resource 131. The list of legitimate devices can be populated over time, for example, by monitoring which of the wireless devices 110 authenticate to a wireless connection of the internal network 130. For example, a smartphone connected to a Wi-Fi of the organization over a secured connection may be added to the list of legitimate devices. In another example, a list of legitimate devices can be retrieved from an external system (e.g., an active directory of the organization). It should be noted that any legitimate device may be a protected computing resource of the organization.

In an embodiment, any legitimate device added to the list is first checked to detect at least known and/or potential vulnerability. For example, a virus scan can be performed prior to adding a device to the list of legitimate devices. As yet another example, if a device is not installed with the recent security patch, such a device may not be included in the list. In another embodiment, an aging counter may be associated with each device added to the list of legitimate devices. The aging counter determines when the respective device should be removed out of the list.

The list of legitimate devices may be saved in the database (not shown) or the system 150, where each wireless device in the list may be designated by, for example, its MAC address, type, vendor, wireless communications supported by devices, other identifiers, or a combination thereof.

The activity of each wireless device 110 in the legitimate list is monitored to at least determine if the wireless device 110 is connected to or forms a wireless network 120 (a network outside of the organization). A wireless network 120 can be formed through a connection to a different wireless device 110 that may be a legitimate or unknown device. An unknown device is a wireless device 110 that cannot be identified as a legitimate device.

Any connection established or acknowledged by a legitimate device is detected based on the data provided by the sensors 140. For example, such data provided by the sensors 140 (hereinafter "protocol-data") may include an indication of a new connection, a network (e.g., MAC) address of a source or destination device, and so on. Based on the network address, it is determined if the wireless connection is with a legitimate or with an unknown device.

Any wireless connection between or among at least two devices, where each of the at least two devices is a legitimate device, is considered as a safe connection and, thus, a wireless network 120 formed based on such a wireless connection is considered safe. As an example, illustrated in FIG. 2, a Bluetooth® connection is established between a smartphone 210 and a laptop 220, where each of the smartphone 210 and the laptop 220 is a legitimate device (e.g., of an employee of the organization). The Bluetooth® network 201 established between the devices 210 and 220 is considered safe. If should be noted that the devices 210 and 220 may be authenticated over a first type of wireless protocol (e.g., IEEE 802.11n) and determined safe when connected using a second type of wireless protocol (e.g., Bluetooth).

Any wireless connection between or among a legitimate device and at least one unknown device is considered as a suspicious connection and, thus, a wireless network formed based on such connected wireless connection is considered suspicious. As an example, illustrated in FIG. 2, a Bluetooth® connection is established between a laptop 220 and a smart-watch (a wearable wireless device) 230. The laptop 220 is a legitimate device, but the smart-watch 230 is an unknown device. The Bluetooth® network 202 established between the devices 220 and 230 is considered suspicious.

Figure 2:
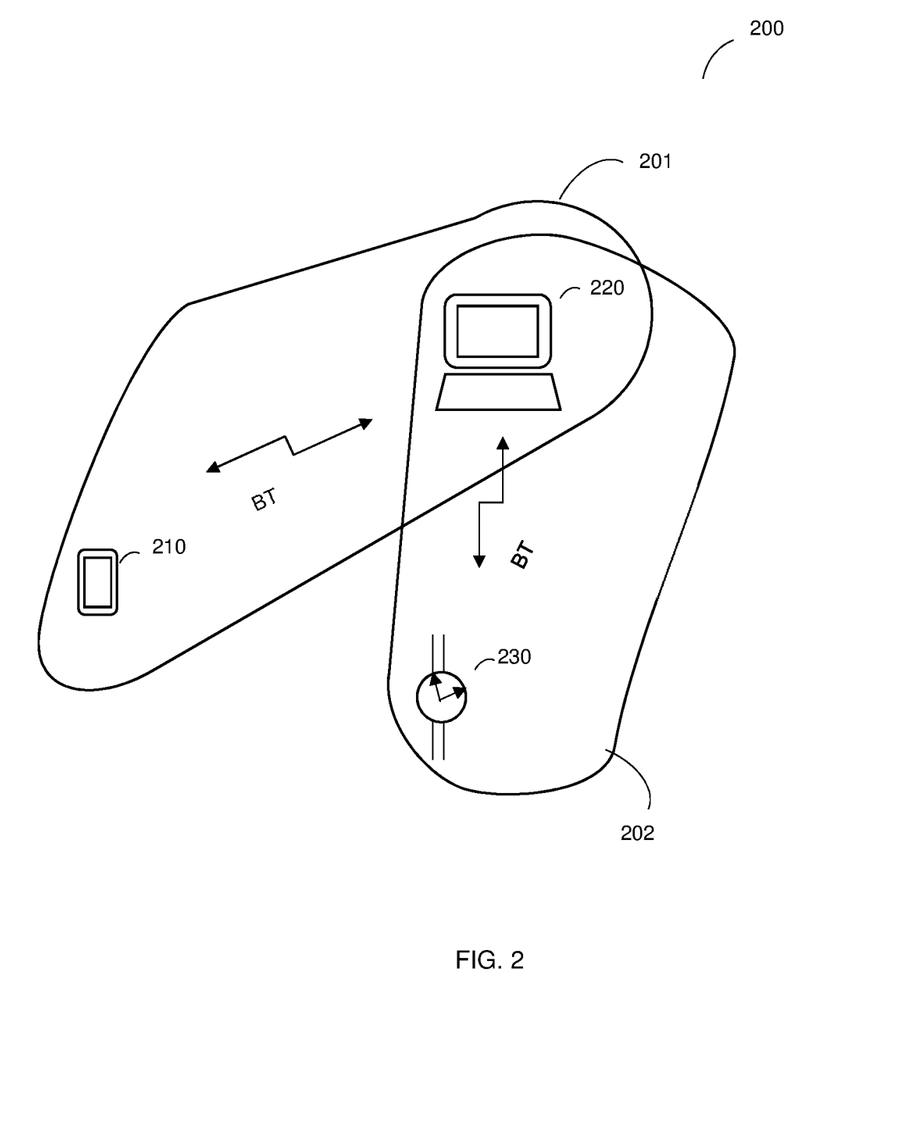
FIG. 2 demonstrates the connectivity of safe and vulnerable networks.

As can be noticed in FIG. 2, a single legitimate device can be part of a safe wireless network and part of a suspicious (or vulnerable) wireless network at the same time. Thus, any connection to or from a legitimate device should be examined to provide a comprehensive security solution.

In another embodiment, one or more investigation actions can be initiated to determine if any identified "suspicious" wireless network is a vulnerable network. In an embodiment, a risk score is determined based on the connection type, transmitted data, usage patterns, a fingerprint of an unknown device, or any combination thereof, based on one or more investigation actions. In a further embodiment, if the risk score is, for example, above a predefined threshold, a suspicious wireless network is determined as a vulnerable network. In another embodiment, any suspicious wireless network may be considered as a vulnerable network.

An investigation action may include, but is not limited to, classifying the data transmitted between the legitimate device and the unknown device (and, particularly, data sourced at the legitimate device). The classification is performed to determine if at least sensitive information is transmitted to the unknown device. To this end, any payload data in the protocol-data is gathered and classified using a data loss prevention (DLP) service. Such a DLP service can be integrated in the security system 150 or one of the external system 160. Typically, a DLP service is designed to detect certain data patterns indicative of the type of data.

If the transmission of sensitive information is detected over the wireless network (e.g., the network 202, FIG. 2), the risk factor of the connection between the legitimate device and the unknown device is set, for example, to a high value (e.g., a value above a predetermined threshold). Sensitive information may include any type of information that is predefined as valuable or confidential for the organization.

Another investigation action includes analyzing a usage pattern of the suspicious wireless network, and particularly the usage pattern over the connection between the legitimate device and the unknown device. The usage pattern may include time periods that the connection is active, amounts of data being transmitted at different time intervals, a number of active devices in the network, and so on. An anomaly is determined based on the usage patterns. The anomaly may be determined further based on baselines for the usage patterns. A baseline for a usage pattern can be derived, for example, based on the type of devices connected in the wireless network, the type of the wireless network, usage patterns of similar networks determined to be safe, and so on. For example, a usage pattern of the wireless network 201 can serve as a baseline for the wireless network 202.

Following are some examples for detecting anomalies based on the usage patterns. The examples will be discussed with reference to the suspicious wireless network 202 shown in FIG. 2. An instance in which the smart-watch 230 remains connected to the laptop 220, thereby maintaining an active connection when the office is closed (e.g., at night time), would be considered as an anomaly. This is due to the fact that a user of the smart-watch 230 is not present at the office at that time. That is, the wireless network 202 is active when it should not be active.

As another example, if the volume of traffic typically transmitted by the smart-watch 230 is low (e.g., 100 KB) at a particular time interval. When it is detected that the smart-watch 230 transmits a high volume of data (e.g., 1 GB), such a transmission would be considered as an anomaly.

When a usage pattern type of anomaly is detected over a wireless network (e.g., the wireless network 202, FIG. 2), the risk factor of the connection between the legitimate device and the unknown device is set, for example, to a high value.

Another investigation action includes analyzing a fingerprint of each unknown device in the suspicious wireless network. In an embodiment, the fingerprint may include the device's type, the OS version or version of other software installed therein, an indication of whether the unknown device is discoverable or connectable to other wireless devices, a number of active wireless connections, and so on. The fingerprint can designate if the wireless device is connected to a network that was not identified. For example, a connection of an unknown device to an internal network through a wired connection may increase the risk of the device.

As an example, if the smart-watch 230 is installed with an OS version known to be vulnerable, the smart-watch 230 is determined as a risky device and the risk factor will be set accordingly. As yet another example, if the smart-watch 230 acknowledges any connection request or ping, the smart-watch 230 is determined as a risky device and the risk factor will be set accordingly.

It should be noted that examples provided below are not limited to the wireless networks and wireless devices demonstrated in FIG. 2. The investigation actions discussed herein can be applied on any type of wireless network and wireless devices.

Returning to FIG. 1, the risk factor determined by any investigation action may be a numerical number (e.g., a number ranging from 0 to 10, where 10 is the highest risk), a deterministic value (e.g., low, medium, high), and the like.

The risk score determined for a suspicious wireless network 120 may be a function of the various risk factors. Such a function can be an average, a weighted average, and the like. As noted above, when the risk score is over a predefined threshold, a suspicious wireless network 120 is determined as a vulnerable network. In some embodiments, a decision to perform a mitigation action is based on the determined risk score.

It should be appreciated that the embodiments disclosed herein are not limited to the specific architecture illustrated in FIG. 1 and other architectures may be used without departing from the scope of the disclosed embodiments. Specifically, in an embodiment, there may be a plurality of security systems 150 operating as described hereinabove and configured to either have one as a standby, to share loads between them, or to split the functions between them. Furthermore, in a typical wireless environment 100 or a typical deployment, there will be a plurality of internal networks 130 which can co-exist, i.e., a single network 130 is shown FIG. 1 merely for purposes of simplicity of the discussion. It should be further noted that, in some configurations, one or more sensors 140 can be embedded in the security system 150.

Figure 3:
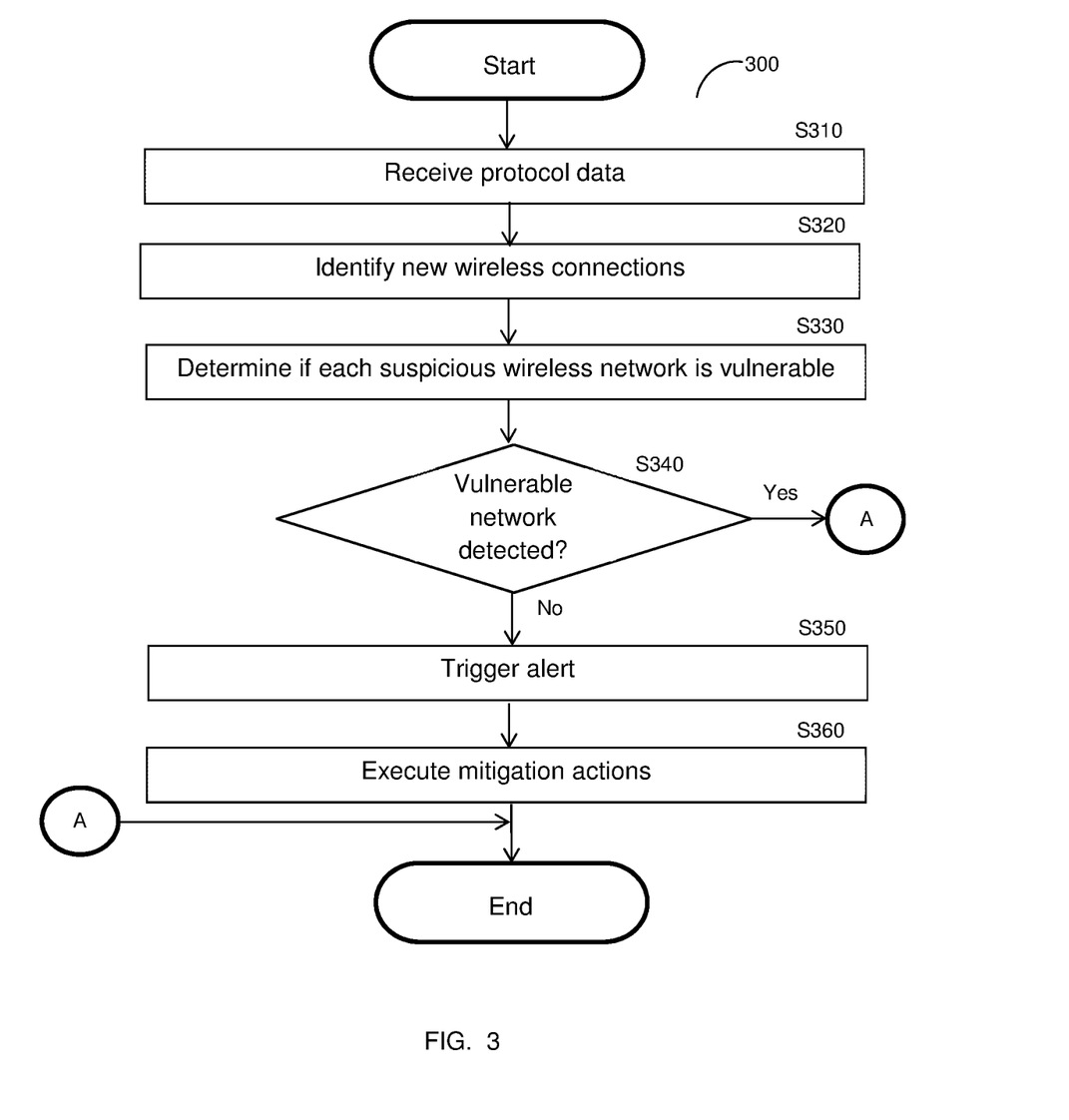
FIG. 3 is a flowchart illustrating a method for detecting vulnerable networks according to an embodiment.

FIG. 3 shows an example flowchart 300 illustrating a method for detecting vulnerable networks according to an embodiment.

At S310, protocol-data extracted by a plurality of sensors is received. In an embodiment, such protocol-data includes an indication of new wireless connections and wireless devices participating in such new wireless connections. The wireless devices can be identified, for example, by network address (e.g., MAC) or by another device identifier. In an embodiment, the received protocol-data may include any payload data transmitted over the wireless medium.

At S320, connections information in the received protocol-data is analyzed to identify at least new wireless connections. In an embodiment, S320 further includes analyzing each such new wireless connection to determine if the connection is between a legitimate device and at least one unknown device. In a further embodiment, if the wireless connection is between a legitimate device and at least one unknown device, a wireless network through which the wireless connection is made is determined as a suspicious wireless network. As noted above, in an embodiment, a wireless device is a legitimate device if the device is designated in a list of legitimate devices, and a wireless device is an unknown device if the device is not listed in the list of legitimate devices. Such a list is populated and maintained by, for example, the security system 150.

Figure 4A:
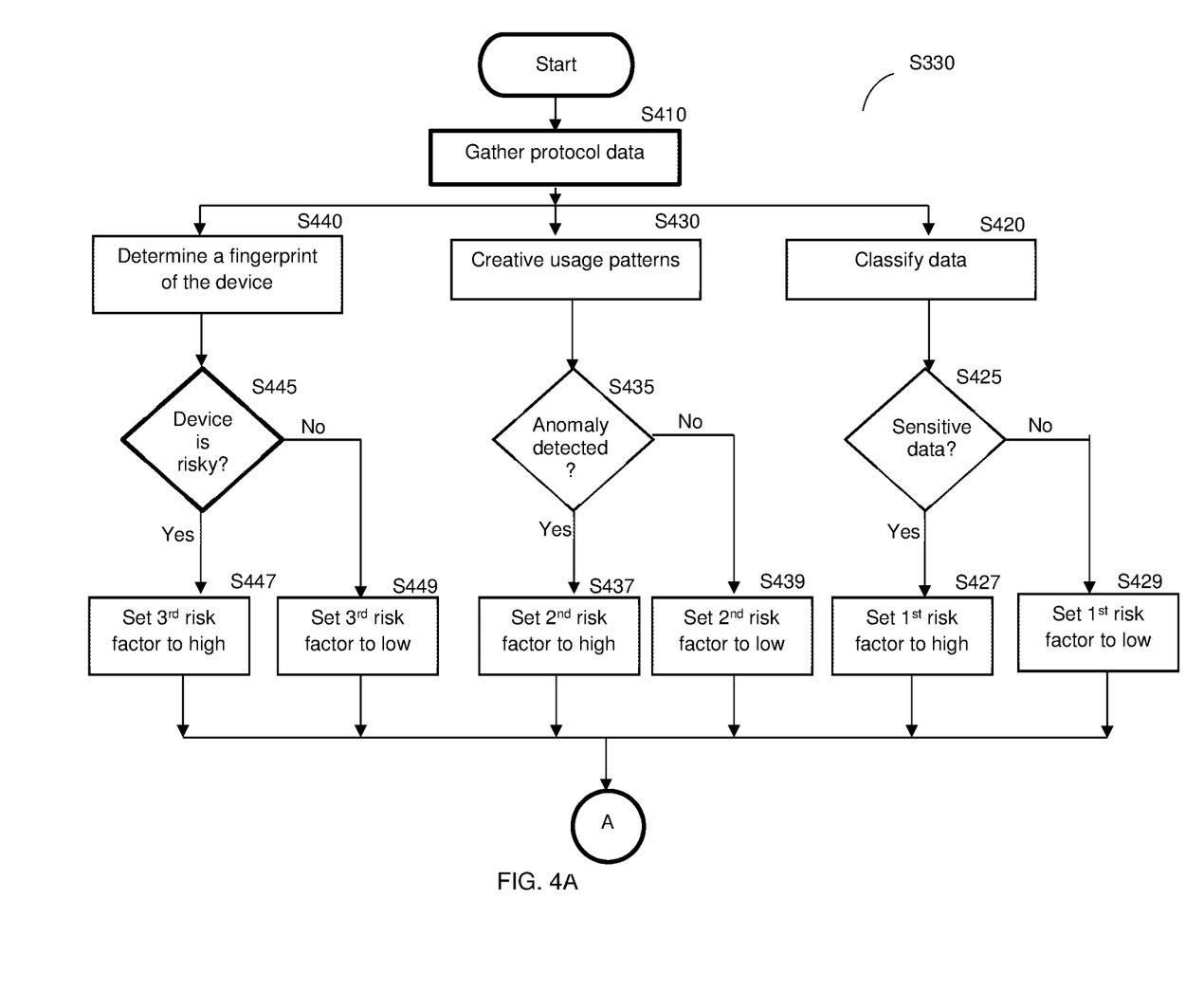
FIGS. 4A-4B are two portions of a flowchart illustrating a process for determining if a suspicious wireless network is vulnerable according to an embodiment.
Figure 4B:
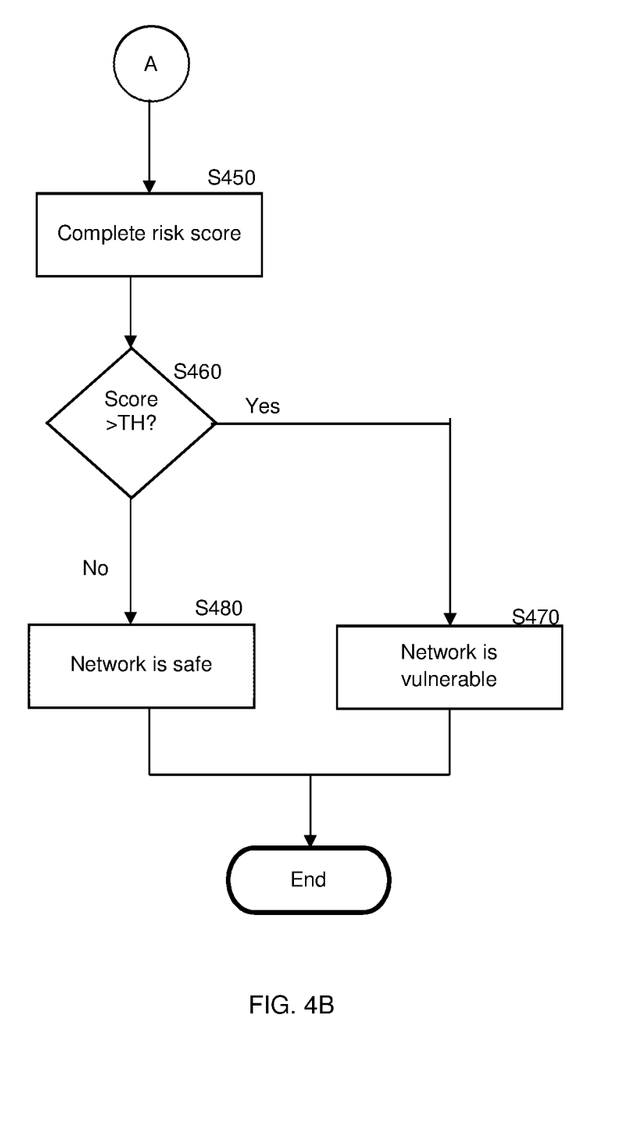

At S330, one or more investigation actions are performed to determine if each identified suspicious wireless network is a vulnerable wireless network. The operation of S330 is discussed in more detail in FIG. 4. In some embodiments, all suspicious wireless networks are determined as vulnerable. Such embodiments may include a number of false positive alerts, but, on the other hand, increases the defense of the organization.

At S340, a check is made to determine if a vulnerable wireless network is detected based on the analysis performed at S330. If so, execution continues with S350; otherwise, execution terminates. At S350, an alert indicating the detected network is triggered. The alert may designate the network connection name, connection type, participate wireless devices, type of detected vulnerably, a combination thereof and so on. Optionally, at S360, at least one mitigation action can be executed. For example, the vulnerable wireless network's connection may be terminated.

FIG. 4 shows an example flowchart S330 illustrating a process method for determining if a suspicious wireless network is vulnerable according to an embodiment. At S410, the received protocol-data of each connection of a suspicious wireless network is gathered and execution proceeds with S420, S430, and S440. In the example embodiment shown in FIG. 4, S420, S430, and S440 are performed in parallel. The data can be gathered over a predefined time period, until there is a sufficient amount of data for processing, or both until a predefined time period has passed and a sufficient amount of data has been gathered.

At S420, the gathered data (i.e., transmitted data) is classified to determine if it contains sensitive information. Such classification can be performed using a DLP service. At S425, it is checked if the data is classified as sensitive information. If so, at S427, a first risk factor is set to a high value; otherwise, at S429, the first risk factor is set to a low value. Some examples are provided above.

At S430, one or more usage patterns in the suspicious wireless network are generated based on the gathered information. Examples for such usage patterns are provided above. At S435, the generated usage patterns are compared to their respective baselines to detect anomalies in the usage patterns and it is checked whether any anomalies have been detected. If at least one anomaly is detected, at S437, a second risk factor is set to a high value; otherwise, at S439, the second risk factor is set to a low value. Some examples are provided above.

At S440, a fingerprint of each unknown device in the suspicious wireless network is determined. In an embodiment, the fingerprint of a device can be retrieved from a database maintaining fingerprints of different devices. In another embodiment, an unknown device can be scanned, for example, using an agent installed therein, and its fingerprint will be reported. As noted above, a fingerprint of a wireless device may include its type, OS's version, discovery options, connectivity options, supported wireless protocols, combinations thereof, and so on.

At S445, the fingerprint of each unknown device is analyzed to determine if the respective device is risky. If so, at S447, a third risk factor is set to a high value; otherwise, at S449, the second risk factor is set to a low value.

It should be node that additional investigation actions may be performed. It should be noted that S420, S430, and S440 can be performed in a different order or executed in parallel. Further, in some embodiments, only one, some, or all of the investigation actions discussed herein are performed.

At S450, a risk score is computed as a function of any of the first, second, and third risk factors. Examples for such a function are provided above. At S460, it is checked if the risk score is greater than a predefined threshold. If so, execution continues with S470, where the suspicious wireless network is determined as vulnerable; otherwise, at S480 the suspicious wireless network is determined as safe.

In an embodiment, the methods discussed with references to FIGS. 3 and 4 are performed by the security system 150 as described in greater detail above.

Figure 5:
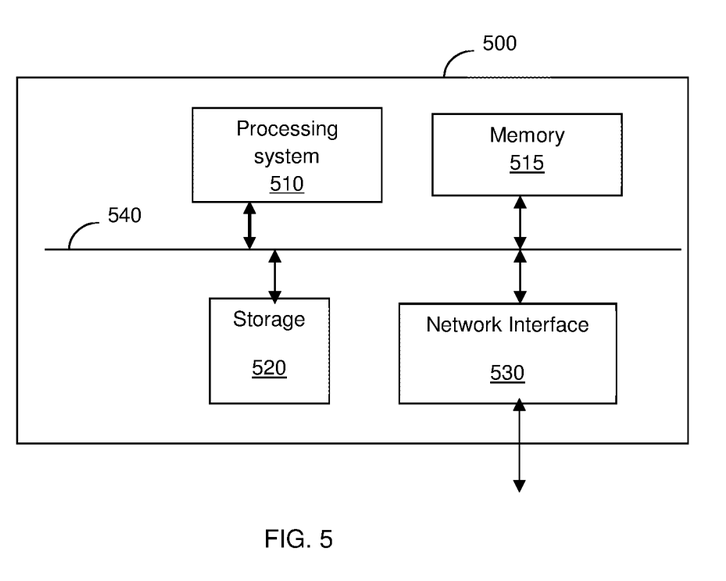
FIG. 5 is a block diagram of a security system according to an embodiment.

FIG. 5 shows an example block diagram of the security system 150 according to an embodiment. The security system 150 includes a processing system 510, a memory 515, a storage 520, and a network interface 530, all connected to a computer bus 540.

The processing system 510 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile, non-volatile, or a combination thereof. The storage 520 may be magnetic storage, optical storage, and the like.

In one configuration, computer readable instructions to implement one or more embodiments disclosed herein may be stored in the storage 520. The storage 520 may also store other computer readable instructions to implement an operating system, an application program, and the like. Computer readable instructions may be loaded in the memory for execution by the processing system 510.

In another embodiment, the storage 520, the memory 515, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 510 to perform the various functions described herein with respect to at least detection of vulnerable wireless networks.

According to some embodiments, the storage 520 may be utilized to store the list of legitimate devices, learnt baselines for usage patterns, generated usage patterns, devices' fingerprints, and so on.

The network interface 530 allows communication with other external systems, the plurality of sensors, and so on. The network interface 530 may include a wired connection or a wireless connection. The network interface 530 may be utilized to transmit communications media, receive communications media, or both. The computer bus 540 may be, for example, a PCIe bus.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method performed by a computerized system, comprising:
   receiving intercepted traffic, wherein the intercepted traffic corresponds to at least one wireless user device operable in an airspace of a wireless environment of an organization and the intercepted traffic is transported using at least one type of wireless protocol;
   analyzing the received traffic to detect at least one new active wireless connection between a legitimate wireless user device of the at least one wireless user device and at least one unknown wireless user device, wherein the legitimate wireless user device comprises a wireless device previously monitored as having authenticated a wireless connection in the wireless environment of the organization to access a protected computing resource of the organization, wherein the received traffic indicates that the legitimate wireless user device is concurrently connected to another legitimate wireless user device by another wireless connection;
   determining if the detected at least one new active wireless connection forms a vulnerable wireless network amongst a plurality of wireless networks in the wireless environment; and
   initiating at least one mitigation action, upon determining that the detected at least one new active wireless connection forms the vulnerable wireless network.

2. The method of claim 1, wherein the received traffic includes data extracted from a wireless protocol utilized for transmission by the at least one wireless user device.

3. The method of claim 2, wherein the received traffic is intercepted by a plurality of sensors deployed in the wireless environment.

4. The method of claim 2, wherein the received traffic includes at least one of: an indication regarding establishment of a new connection, an indication regarding existence of an active connection, a network address of any source, a destination user device participating in the detected at least one new active wireless connection, or payload data.

5. The method of claim 4, wherein the at least one type of wireless protocol is any one of: Wi-Fi, nRF, long term evolution (LTE), cellular communication protocols, Bluetooth, Wi-Gi, Zigbee, 5 Bluetooth Low Energy (BLE), EnOcean, digital enhanced cordless telecommunications (DECT), and Z-wave.

6. The method of claim 1, wherein an unknown wireless user device is a user wireless device not authorized to access the protected computing resource.

7. The method of claim 1, wherein determining if the detected at least one new active connection forms a vulnerable wireless network further comprises:
   performing at least one investigation action;
   determining a risk factor based on each of the at least one investigation action;
   computing a risk score based on the determined risk factor; and
   determining that the detected at least one new active wireless connection is a vulnerable wireless network, when the risk score meets or exceeds a predefined threshold.

8. The method of claim 7, wherein the at least one investigation action is at least one of:
   determining whether the at least one unknown wireless user device bridges between the legitimate wireless user device and an external resource;
   detecting at least one anomaly based on a usage pattern of the detected at least one new active wireless connection;
   classifying a type of information transmitted over the detected at least one new active wireless connection; or
   analyzing a fingerprint of the at least one unknown wireless user device.

9. The method of claim 1, further comprising:
   generating an alert, upon determining that the detected at least one new active wireless connection forms the vulnerable wireless network.

10. The method of claim 1, further comprising:
performing at least one security check on each wireless device prior to determine if the wireless user device is legitimate.

11. The method of claim 1, wherein the legitimate wireless user device is a protected computing resource.

12. A system comprising:
a processing circuitry; and
a memory, the memory containing instructions that, when executed by the processing circuitry, configure the system to:
receive intercepted traffic, wherein the intercepted traffic corresponds to at least one wireless user device operable in an airspace of a wireless environment of an organization and the intercepted traffic is transported using at least one type of wireless protocol;
analyze the received traffic to detect at least one new active wireless connection between a legitimate wireless user device of the at least one wireless user device and at least one unknown wireless user device, wherein the legitimate wireless user device is at least legitimately authorized to access a protected computing resource of the organization;
determine if the detected at least one new active wireless connection forms a vulnerable wireless network based at least in part on whether the at least one new active wireless connection bridges between an internal network of the organization and an external resource, wherein the external resource is separate from the at least one unknown wireless user device and the legitimate wireless user device; and
initiate at least one mitigation action, upon determining that the detected at least one new active wireless connection forms the vulnerable wireless network.

13. The system of claim 12, wherein the received traffic includes data extracted from a wireless protocol utilized for transmission by the at least one wireless user device.

14. The system of claim 13, wherein the received traffic is intercepted by a plurality of sensors deployed in the wireless environment.

15. The system of claim 13, wherein the received traffic includes at least one of: an indication regarding establishment of a new connection, an indication regarding existence of an active connection, a network address of any source, a destination user device participating in the detected at least one new active wireless connection, or payload data.

16. The system of claim 15, wherein the at least one type of wireless protocol is any one of: Wi-Fi, nRF, long term evolution (LTE), third generation, Bluetooth, Wi-Gi, Zigbee, and Z-Wave.

17. The system of claim 12, wherein an unknown wireless user device is a wireless user device not authorized to access the protected computing resource.

18. The system of claim 12, wherein the system is further configured to:
perform at least one investigation action;
determine a risk factor based on each of the at least one investigation action;
compute a risk score based on the determined risk factor; and
make a determination that the detected at least one new active wireless connection is a vulnerable wireless network, when the risk score meets or exceeds a predefined threshold.

19. The system of claim 18, wherein the at least one investigation action is at least one of:
detecting at least one anomaly based on a usage pattern of the detected at least one new active wireless connection;
classifying a type of information transmitted over the detected at least one new active wireless connection; or
analyzing a fingerprint of the at least one unknown wireless user device.

20. The system of claim 12, wherein the system is further configured to:
generate an alert, upon determining that the detected at least one new active wireless connection forms the vulnerable wireless network.

21. The system of claim 12, wherein the system is further configured to:
performing at least one security check on each wireless user device prior to determine if the wireless user device is legitimate.

22. The system of claim 12, wherein the legitimate wireless user device is a protected computing resource.

23. A non-transitory computer readable medium having stored thereon instructions which, when executed by one or more processing units, cause the one or more processing units to perform operations comprising:
receiving intercepted traffic, wherein the intercepted traffic is transmitted by at least one wireless user device operable in an airspace of a wireless environment of an organization and the intercepted traffic is transported using a first wireless protocol of at least one type of wireless protocol;
analyzing the received traffic to detect at least one new active wireless connection between a legitimate wireless user device of the at least one wireless user device and at least one unknown wireless user device, wherein the legitimate wireless user device is at least legitimately authorized to access a protected computing resource of the organization, wherein the legitimate wireless user device comprises a wireless device previously monitored as having authenticated a wireless connection using a second wireless protocol in the wireless environment of the organization, wherein the second wireless protocol is different from the first wireless protocol;
determining if the detected at least one new active wireless connection forms a vulnerable wireless network based at least in part on whether the at least one new active wireless connection bridges between the protected computing resource and an external resource; and
initiating at least one mitigation action, upon determining that the detected at least one new active wireless connection forms the vulnerable wireless network.

24. The non-transitory machine readable medium of claim 23, wherein the external resource is separate from the legitimate wireless user device and the at least one unknown wireless user device.

25. The non-transitory machine readable medium of claim 24, wherein the external resource comprises at least one of a command-and-control server or a drop zone.

* * * * *